(12) United States Patent
Kim

(10) Patent No.: US 9,448,864 B2
(45) Date of Patent: Sep. 20, 2016

(54) METHOD AND APPARATUS FOR PROCESSING MESSAGE BETWEEN PROCESSORS

(71) Applicant: HANWHA TECHWIN CO., LTD., Changwon-si (KR)

(72) Inventor: JiMin Kim, Suwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 58 days.

(21) Appl. No.: 14/420,713

(22) PCT Filed: Jul. 23, 2013

(86) PCT No.: PCT/KR2013/006558
§ 371 (c)(1),
(2) Date: Feb. 10, 2015

(87) PCT Pub. No.: WO2014/025145
PCT Pub. Date: Feb. 13, 2014

(65) Prior Publication Data
US 2015/0242254 A1   Aug. 27, 2015

(30) Foreign Application Priority Data

Aug. 10, 2012   (KR) .................. 10-2012-0087992

(51) Int. Cl.
*G06F 12/00*   (2006.01)
*G06F 9/54*   (2006.01)
*G06F 13/362*   (2006.01)
*G06F 13/26*   (2006.01)
(Continued)

(52) U.S. Cl.
CPC ............ *G06F 9/546* (2013.01); *G06F 9/4831* (2013.01); *G06F 9/4881* (2013.01); *G06F 9/544* (2013.01); *G06F 13/1663* (2013.01);
(Continued)

(58) Field of Classification Search
CPC .... G06F 9/546; G06F 9/4831; G06F 9/4881; G06F 9/544; G06F 13/1663; G06F 13/18; G06F 13/22; G06F 13/26; G06F 13/362; G06F 2209/544; G06F 2209/548
See application file for complete search history.

(56) References Cited

U.S. PATENT DOCUMENTS

| 6,058,460 A | 5/2000 | Nakhimovsky | |
| 2006/0248218 A1* | 11/2006 | Kuribayashi | G06F 15/16 709/232 |

(Continued)

FOREIGN PATENT DOCUMENTS

| JP | 06-318191 A | 11/1994 |
| JP | 09-069053 A | 3/1997 |

(Continued)

OTHER PUBLICATIONS

English translation of Japanese Patent No. JP2012108576A provided by Google Patents (http://patents.google.com).*

(Continued)

*Primary Examiner* — Shawn X Gu
(74) *Attorney, Agent, or Firm* — Sughrue Mion, PLLC

(57) ABSTRACT

A message processing apparatus that processes a message between processors according to an embodiment of the present invention solves a problem that occurs when a message is processed by using interrupt or polling processing by processing messages having priorities that are transmitted between transmission and receiving processors that use a shared memory by using a polling thread and a kernel module, thereby providing a priority-based message processing method without applying a load to a system.

16 Claims, 4 Drawing Sheets

```
IF (IS THERE MESSAGE THAT IS TO BE RECEIVED IN RECEIVING
    MESSAGE WAITING QUEUE?) {
        IF (HIGHEST PRIORITY AMONG RECEIVED MESSAGES > HIGHEST
            PRIORITY AMONG EXECUTABLE THREADS) {
                EXTRACT MESSAGE HAVING HIGHEST PRIORITY
                FROM RECEIVED MESSAGES;
                RECEIVE MESSAGE HANDLING THREADS FROM THREAD POOL;
                TRANSFER MESSAGES TO CORRESPONDING THREADS
                TO PROCESS MESSAGES;

}
}
```

(51) Int. Cl.
　　　G06F 13/16　　　(2006.01)
　　　*G06F 13/22*　　　(2006.01)
　　　*G06F 9/48*　　　(2006.01)
　　　*G06F 13/18*　　　(2006.01)

(52) U.S. Cl.
　　　CPC .............. *G06F 13/18* (2013.01); *G06F 13/22* (2013.01); *G06F 13/26* (2013.01); *G06F 13/362* (2013.01); *G06F 2209/544* (2013.01); *G06F 2209/548* (2013.01)

(56) References Cited

U.S. PATENT DOCUMENTS

2012/0159501 A1　　6/2012　Lee et al.
2012/0221795 A1　　8/2012　Hoshaku et al.

FOREIGN PATENT DOCUMENTS

| JP | 10-063568 A | 3/1998 |
|---|---|---|
| JP | 2006-309512 A | 11/2006 |
| JP | 2006309512 A * | 11/2006 |
| JP | 2012-009063 A | 1/2012 |
| JP | 2012-022616 A | 2/2012 |
| JP | 2012-053817 A | 3/2012 |
| JP | 2012-108576 A | 6/2012 |
| JP | 2012108576 A * | 6/2012 |
| KR | 10-2001-0035652 A | 5/2001 |
| KR | 10-2006-0126065 A | 12/2006 |
| KR | 10-2012-0070303 A | 6/2012 |
| WO | 2008/066511 A1 | 6/2008 |

OTHER PUBLICATIONS

Search Report dated Oct. 22, 2013, issued by the International Searching Authority in counterpart International Application No. PCT/KR2013/006558.

Written Opinion dated Oct. 22, 2013, issued by the International Searching Authority in counterpart International Application No. PCT/KR2013/006558.

\* cited by examiner

Fig. 1
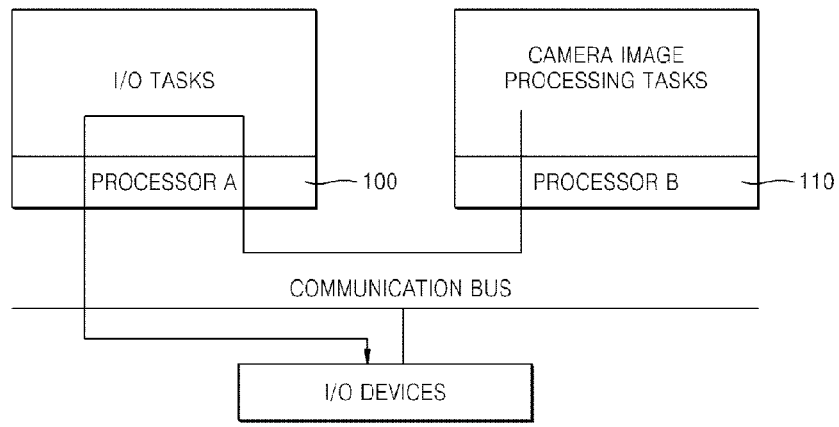
Fig. 2
```
loop
    if (is it message?) then
        dequeue a highest priority message of messages
        handle the message
```
Fig. 3
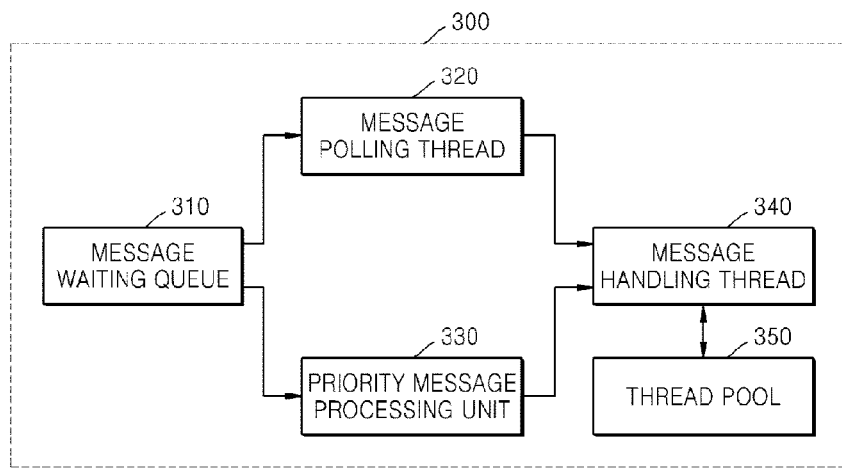
Fig. 4a
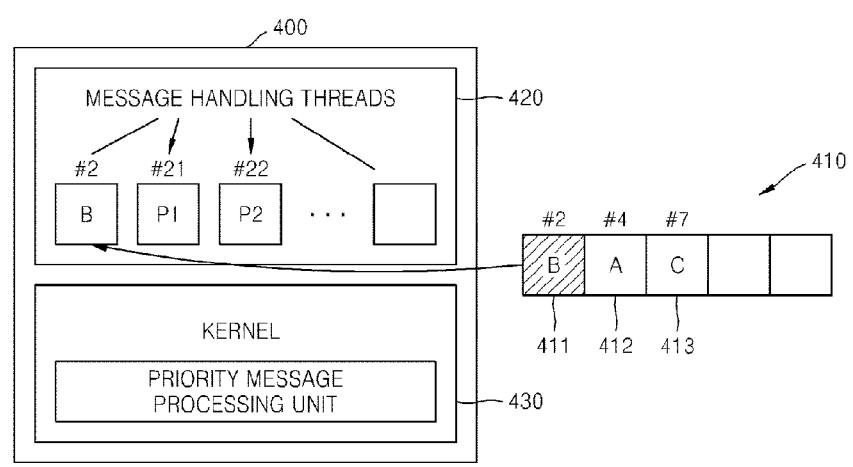

Fig. 4b

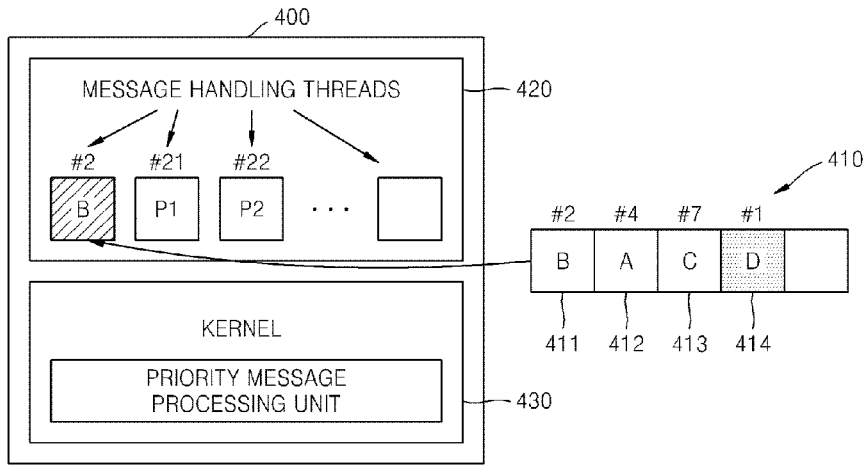

Fig. 5

```
LOOP
    IF (IS THERE MESSAGE THAT IS TO BE PROCESSED IN RECEIVING
        MESSAGE WAITING QUEUE?) {
            EXTRACT MESSAGE HAVING HIGHEST PRIORITY FROM
            RECEIVED MESSAGES;
            RECEIVE MESSAGE HANDLING THREADS FROM THREAD POOL;
            TRANSFER MESSAGES TO CORRESPONDING THREADS
            TO PROCESS MESSAGES;
    }
```

Fig. 6

```
LOOP
    RECEIVE MESSAGES FROM MESSAGE POLLING THREAD;
    RECEIVE PRIORITIES OF CORRESPONDING MESSAGES;
    PROCESS MESSAGES;
    RETURN TO THREAD POOL AND AWAIT UNTIL NEXT MESSAGE
    PROCESSING REQUEST IS RECEIVED ;
}
```

Fig. 7

```
IF (IS THERE MESSAGE THAT IS TO BE RECEIVED IN RECEIVING
    MESSAGE WAITING QUEUE?) {
        IF (HIGHEST PRIORITY AMONG RECEIVED MESSAGES > HIGHEST
            PRIORITY AMONG EXECUTABLE THREADS) {
                EXTRACT MESSAGE HAVING HIGHEST PRIORITY
                FROM RECEIVED MESSAGES;
                RECEIVE MESSAGE HANDLING THREADS FROM THREAD POOL;
                TRANSFER MESSAGES TO CORRESPONDING THREADS
                TO PROCESS MESSAGES;
        }
}
```

Fig. 8

```
LOOP
    IF (IS THERE MESSAGE THAT IS TO BE PROCESSED IN RECEIVING
    MESSAGE WAITING QUEUE?) {
        EXTRACT MESSAGE HAVING HIGHEST PRIORITY FROM
        RECEIVED MESSAGES;
        IF (IS SELECTED MESSAGE NON-BLOCKING MESSAGE?) {
            RECEIVE PRIORITIES OF MESSAGES;
            PROCESS MESSAGES;
            RETURN TO LOWEST PRIORITY FOR RE-EXECUTION IN IDLE TIME;
        }
        ELSE {
            RECEIVE ONE MESSAGE HANDLING THREAD FROM THREAD POOL;
            TRANSFER MESSAGES TO CORRESPONDING THREAD TO
            PROCESS MESSAGES;
        }
    }
}
```

Fig. 9

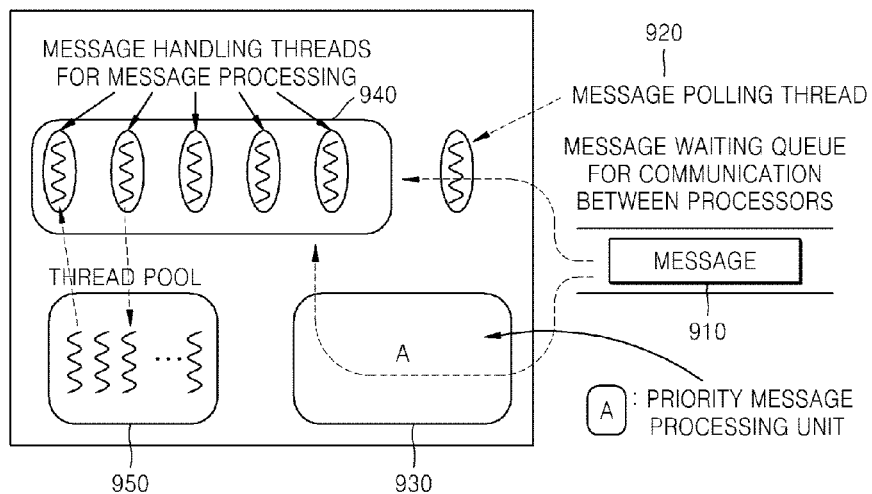

METHOD AND APPARATUS FOR PROCESSING MESSAGE BETWEEN PROCESSORS

TECHNICAL FIELD

The present invention relates to a method of processing message communication between processors performed by a multiprocessor.

BACKGROUND ART

In general, a multiprocessor, including a shared memory, performs a message notification event between processors through an inter-processor interrupt (IPI) that is an interrupt for asynchronous event notification. For example, when a processor A transfers a message to a processor B, the processor A generates the IPI to be transmitted to the processor B after storing a message that is to be transmitted on the shared memory. The processor B, in which an interrupt occurs, stops an existing execution flow and receives a message arrival event and a message, and thus a message notification is performed.

DISCLOSURE OF INVENTION

Technical Problem

Communication between processors based on a frequent interrupt is pointed out as a main factor that reduces a system processing throughput like stopping a normal execution flow of a system as well as excessive overhead.

The present invention solves problems in message processing and message communication processing between processors.

Solution to Problem

According to an aspect of the present invention, there is provided a message processing method performed in a receiving processor, the method including: receiving and processing messages stored in a message waiting queue of a shared memory according to priorities of the messages in a message polling thread; when a kernel is called, searching the message waiting queue in a priority message processing unit, instead of for the message polling thread; comparing a priority of a message having the highest priority stored in the message waiting queue and a priority of a thread having the highest priority among executable threads on the message processing processor; and if the priority of the message having the highest priority stored in the message waiting queue is higher than the priority of the thread having the highest priority, processing the corresponding message in the priority message processing unit.

According to another aspect of the present invention, there is provided a message processing apparatus that processes a message between processors, the apparatus including: a message waiting queue for temporarily storing messages having priorities that are transmitted between a transmission processor and a receiving processor that use a shared memory; a message polling thread for receiving the messages according to priorities by monitoring the message waiting queue by using polling processing in an idle time of the receiving processor; a priority message processing unit for monitoring the message waiting queue instead of the message polling thread when a kernel is called, and, if a priority of a message having the highest priority stored in the message waiting queue is higher than that of a thread having the highest priority among executable threads of the receiving processor, receiving the message having the highest priority; and a message handling thread for processing the messages received from the message polling thread or the priority message processing unit based on the priorities, if message processing is complete, returning to a thread pool, and awaiting until a next message processing request is received.

Advantageous Effects of Invention

According to an embodiment of the present invention, an apparatus for processing a message between processors processes a message in which priority is set by using a polling thread and a kernel module, thereby solving a system processing throughput and a real-time property reduction due to a frequency overhead occurrence in communication between processors based on an interrupt.

BRIEF DESCRIPTION OF DRAWINGS

FIG. 1 illustrates a system for processing a message between processors, according to an embodiment of the present invention;

FIG. 2 illustrates an example of performing message communication processing by implementing polling processing as a kernel service;

FIG. 3 is a block diagram of an apparatus for processing a message between processors for explaining an example of processing the message, according to an embodiment of the present invention;

FIGS. 4A and 4B are diagrams for explaining an example of processing a message in detail in an apparatus for processing a message between processors, according to an embodiment of the present invention;

FIG. 5 illustrates an example of an execution flow of a message polling thread in a processor as a pseudo code according to an embodiment of the present invention;

FIG. 6 illustrates an example of an execution flow of a message handling thread in a processor as pseudo code according to an embodiment of the present invention;

FIG. 7 illustrates an example of an execution flow of a priority message processing unit in a processor as pseudo code according to an embodiment of the present invention;

FIG. 8 illustrates an example of an execution flow of a message polling thread in a processor as pseudo code according to another embodiment of the present invention;

FIG. 9 illustrates an internal configuration of the apparatus for processing a message between processors, according to an embodiment of the present invention.

BEST MODE FOR CARRYING OUT THE INVENTION

Figure 10:
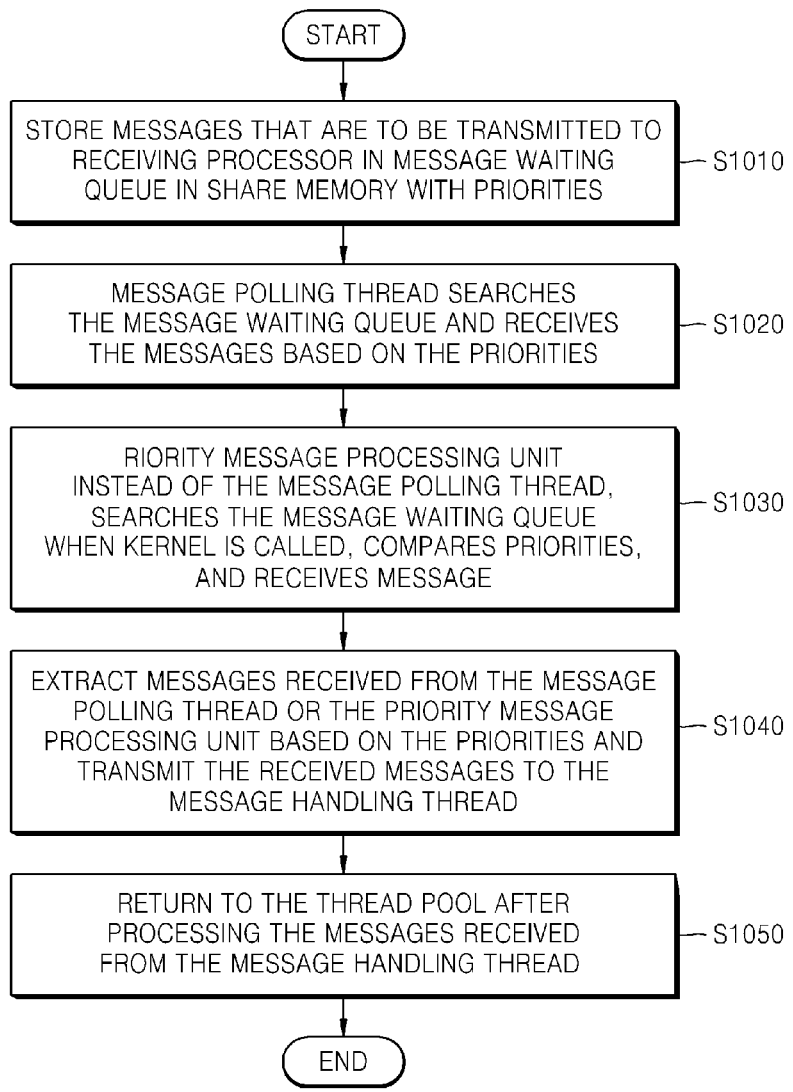
FIG. 10 is a flowchart of a method of processing a message between processors, according to an embodiment of the present invention.

According to an aspect of the present invention, there is provided a message processing apparatus that processes a message between processors, the apparatus including: a message waiting queue implemented in a shared memory and temporarily storing messages, wherein each of the messages includes priority information indicating a task processing order; a message polling thread for receiving the messages in order of high priorities by monitoring the message waiting queue by using a polling thread in an idle time of a receiving processor that uses the shared memory; and a priority message processing unit for monitoring the message waiting queue instead of the message polling thread when a kernel is called, and, if a message having a higher priority than that of a thread having the highest priority among executable threads is stored in the message waiting queue, processing the corresponding message.

Mode for the Invention

Hereinafter, the present invention will be described more fully with reference to the accompanying drawings, in which exemplary embodiments of the invention are shown. Like reference numerals denote like elements throughout.

While describing the present invention, detailed descriptions about related well known functions or configurations that may blur the points of the present invention are omitted.

As those skilled in the art would realize, the described embodiments may be modified in various different ways, all without departing from the spirit or scope of the present invention.

FIG. 1 illustrates a system for processing a message between processors A 100 and B 110, according to an embodiment of the present invention.

According to an embodiment of the present invention, the system for processing a message may use the at least two processors A 100 and B 110. The processors A 100 and B 110 may be implemented to use a shared memory.

Provided that the processor A 100 performs input and output service tasks, and the processor B 110 performs an image processing task, the processor B 110 needs to process the image processing task and store or record the processed task. To this end, the processor B 110 generates a recoding requesting message and transmits the message to the processor A 100, which performs input and output processing.

When the processor B 110 needs a specific service or a specific task of the processor A 100, such as "storage", "recording", "display", or "network protocol processing", the processor B 110 is required to perform message communication with the processor A 100 for requesting a service from the processor A 100.

For example, the processor B 110 performs image processing on image data received from a sensor and stores the image data in a shared memory (not shown). Thereafter, when the image data stored in the shared memory is to be "displayed", the processor B 110 transmits a message to the processor A 100 to display the stored image data. The message includes message type information, priority information of a "display" operation, and location information of the image data stored in the shared memory.

The processor A 100 is supposed to receive the message and perform a corresponding task according to the priority information included in the message.

An example in which internal service tasks of the processor A 100 are interrupted by receiving the message from the processor B 110 will now be described. That tasks in the processor A 100 are performed based on the pre-defined priorities. In the example described below, priority 2 is higher than priority 3, and the smaller the number, the higher the priority.

Internal service tasks of the processor A 100
Image data display service, priority 3
Audio output service, priority 2
Web server execution service, priority 5

The above service priorities may be set when a priority input is received from a user or an initial system is manufactured.

According to an embodiment of the present invention, when the processor A 100 receives a message including information "executing a network protocol processing service to transmit image data through a network card, priority 4" from the processor B 110, the processor A 100 performs the following process:

If the processor A 100 was executing the "audio output service" before receiving the message from the processor B 110, after completely executing the audio output service, the processor A 100 compares priorities of services that are to be processed and priorities of jobs included in the message received from the processor B 110.

In more detail, the processor A 100 compares the priorities of the image data display service (priority 3), the web server execution service (priority 5), and the protocol processing service to transmit image data through the network card (priority 4) and executes the image data display service (priority 3) having the highest priority. This will be described in detail with reference to FIGS. 3 and 4A.

According to an embodiment of the present invention, when the processor A 100 receives a message requesting to process a service (for example, priority 1) having a higher priority than that of the image data display service (priority 3) from the processor B 110 when executing the image data display service (priority 3), the processor A 100 is implemented to execute the service corresponding to the priority 1 through a kernel call. This will be described in detail with reference to FIGS. 3 and 4B.

In the above-described embodiment of the present invention, a delay frequency of a received message by a message having a lower priority than that of the received message is allowed to be one time at the maximum, thereby predicting a delay time.

According to an embodiment of the present invention, a problem of message communication between processors that is performed based on an interrupt and a problem that occurs when a polling method is performed inside a kernel are to be resolved.

Interrupt-based event processing is effective to guarantee real-time event processing. A processor is difficult to predict an asynchronous interrupt event, requiring an exception event processing procedure to handle the asynchronous interrupt event, In this regard, the processor temporarily stops a task that being performed and the interrupt is processed with the highest priority.

However, since considerable overhead is necessarily accompanied by the exception processing, a frequent interrupt may deteriorate a throughput of the entire system. In general, if the exception occurs in the processor, an exception processing entry and a return overhead necessary for stopping the task that is currently being performed, processing the exception, and normally returning to the task that is currently being performed are generated. Further, data of a plurality of embedded apparatuses used to increase the performance of the processor, such as a pipeline, a cache, a branch prediction module, etc. included in the processor, becomes useless during the exception processing. At this time, a performance deterioration between several tens of % and several hundreds of % temporarily occurs. Several tens of thousands of cycles are necessary for returning to a normal level.

For external event processing, except the interrupt-based event processing, there is polling processing fashion as another method. Unlike the interrupt-based event processing, the polling processing periodically inspects an arrival of an event itself and has a demerit of busy waiting for a precious processor time in inspecting the arrival of the event.

The polling processing is continuously a bad influence on a responsiveness of the system, and thus most computing systems recently adopt interrupt-based external event processing.

FIG. 2 illustrates an example of performing message communication processing by implementing polling processing in a kernel to transmit messages between processors.

Referring to FIG. 2, when a kernel service is implemented by using the polling method, a process of determining whether a message is received, when there is a message that is to be processed, processing the corresponding message, and determining whether the message is received again is repeatedly performed.

However, such a method may largely cause the following three problems to occur:

First, responsiveness of other kernel services and application tasks may seriously deteriorate according to an execution cycle of a message processing loop.

Second, when a blocking message is processed in the kernel, the entire kernel may be blocked.

Messages transmitted between processors may be largely classified into blocking messages and non-blocking messages. A blocking message is a message that needs to wait until a specific event is transmitted and received to perform message processing. For example, when the message that is to be processed requires reading a file from a hard disk drive, corresponding message processing is delayed until a file transmission event of the hard disk drive occurs. These types of messages are blocking messages.

When the blocking message requires receiving an input value from an external input and output apparatus, the message processing is blocked until the corresponding input value is received from the external input and output apparatus. As a result, when the blocking message has been received, since the message processing is blocked until a required value is received from the external input and output apparatus, the entire kernel may be blocked.

Third, when a message is processed by using polling processing in the kernel, a priority inversion may frequently occur. For example, when a blocking message that is currently executing requires receiving an input value from the external input and output apparatus, a problem occurs that messages that arrive after the blocking message is executed and have higher priorities than that of the blocking message await for an unpredictable period of time.

FIG. 3 is a block diagram of an apparatus 300 for processing a message between processors for explaining an example of processing the message, according to an embodiment of the present invention. In more detail, an example of processing a message transmitted from a transmission processor in a receiving processor is illustrated. FIGS. 4A and 4B are diagrams for explaining an example of processing a message in detail in an apparatus for processing the message between processors, according to an embodiment of the present invention.

A message waiting queue 310 temporarily stores messages having priorities. In this case, the messages are transmitted between the transmission processor and the receiving processor that use a shared memory. The transmission processor allocates priorities to the messages and inserts the messages into the message waiting queue 310. Thereafter, the receiving processor retrieves the messages from the message waiting queue 310 based on the priorities.

Referring to FIG. 4A, the transmission processor inserts messages into a message waiting queue 410. In this case, priority is allocated to each of the messages. Priority 2, priority 4, and priority 7 are respectively allocated to a message B 411, a message A 412, and a message C 413.

A receiving processor 400 reads a message having the highest priority in the message waiting queue 410. In FIG. 4A, the receiving processor 400 reads the message B 411 in the message waiting queue 410.

A message polling thread 320 searches the message waiting queue 310 by using polling processing of FIG. 5 in an idle time of the receiving processor and receives the messages according to the priorities. A main operation of the message polling thread 320 is as shown in FIG. 5.

Referring to FIG. 4A, a message polling thread 420 searches the message waiting queue 410 and receives the messages according to the priorities.

However, according to an embodiment of the present invention, when a kernel is called by the receiving processor, a priority message processing unit 330, instead of the message polling thread 320, searches the message waiting queue 310.

The message polling thread 320 receives a message in the order of highest priorities and processes the highest priority message, for example, a message A. The message waiting queue 310, however, receives a message, for example, a message B, having a higher priority than that of the message A being processed in the message polling thread 320 right arrival after accepting the message A, the message B has to wait for the processing for an unpredictable period of time since the message polling thread 320 processes the messages by using polling processing.

To solve this problem, when the kernel is called according to an embodiment of the present invention, the priority message processing unit 330 searches the message waiting queue 310.

The kernel is called to execute a kernel service that is generally a system service that may be provided to a plurality of application programs. For example, the kernel provides network protocol processing, a file service, a memory management service, a scheduling service, an external event transmission and reception service, etc. When the kernel is called to process an external event, as described above, a task that is currently being performed is stopped, a corresponding event processing handler is performed to process the external event, a scheduler is called, and a next task is performed. The event processing handler reads and processes data that is to be processed in a promised buffer, and as a result, and processes events in order of arrival (on a first-come first-served basis).

In addition, when a task changes its state from waiting to ready, when the task changes the state from running to finishing, when the task changes the state from running to waiting, and when a new task arrives, the kernel is called to schedule execution of the next task. The kernel is also called when the kernel service, such as writing a file on an application program, is requested.

According to an embodiment of the present invention, when a priority of a message having the highest priority in the message waiting queue 310 is higher than a priority of a thread having the highest priority among threads that are executable in the receiving processor as shown in FIG. 7, the priority message processing unit 330 receives the message having the highest priority.

For example, referring to FIGS. 4A and 4B, when the message polling thread 420 receives and processes the "message B" 411 having the highest priority among the messages included in the message waiting queue 410, and a "message D" 414 having a higher priority than that of the "message B" 410 arrives in the message waiting queue 410, if the kernel is called, a priority message processing unit 430 compares priorities of the messages included in the message waiting queue 410 and priorities of threads that are in running or ready state.

Referring to FIG. 3, a message handling thread 340 processes the messages received from the message polling thread 320 or the priority message processing unit 330 in the order of priorities thereby completely perform message processing, returns to a thread pool 350, and awaits until a next message processing request is received.

When the message handling thread 340 receives the messages from the message polling thread 320, an operation shown in FIG. 6 is performed. When the message handling thread 340 receives the messages from the priority message processing unit 330, an operation shown in FIG. 7 is performed.

According to another embodiment of the present invention, when the messages included in the message waiting queue 310 are non-blocking messages, the message polling thread 320 may directly process the corresponding messages. This will be described with reference to FIG. 8.

Referring to FIG. 8, when the message polling thread 320 receives a non-blocking message, the message polling thread 320 may not assign the received non-blocking message to a message handling thread but may directly process the corresponding non-blocking message. However, when the message polling thread 320 receives a blocking message, as described above, the message handling thread assigned in the thread pool 350 processes the received blocking message.

FIG. 9 illustrates an internal configuration of the message processing apparatus 300 that processes a message between processors, according to an embodiment of the present invention.

Referring to FIG. 9, the message processing apparatus 300 includes a message waiting queue 910, a message polling thread 920, a priority message processing unit 930, a message handling thread 940, and a thread pool 950.

The message waiting queue 910 stores messages transmitted between transmission and receiving processors that use a shared memory. For example, the message waiting queue 910 may be implemented in a data structure in the shared memory accessible by each processor (for example, the processors A 100 and B 110 of FIG. 1).

According to an embodiment of the present invention, the transmission processor allocates priorities to the messages and inserts the messages into the message waiting queue 910. Thereafter, the receiving processor retrieves the messages from the message waiting queue 910.

The message polling thread 920 of the receiving processor continuously searches or monitors the message waiting queue 910 by using polling method and receives the messages stored in the message waiting queue 910 according to priorities.

If the message polling thread 920 determines a message that is to be processed in the message waiting queue 910, as shown in FIG. 5, the message polling thread 920 extracts a message having the highest priority. Thereafter, the message polling thread 920 receives the message handling thread 940 from the thread pool 950, and transmits the message to the corresponding message handling thread 940 to process the extracted message.

The message polling thread 920 has, for example, the lowest priority in a system as shown in FIG. 1 so that the message polling thread 920 is performed in an idle time having no executable thread or process.

When the message handling thread 940 receives a message processing request from the message polling thread 920, the message handling thread 940 selects the message having the highest priority from the messages stored in the message waiting queue 910.

The threads used according to an embodiment of the present invention may be running, waiting, and ready threads to process a blocking message, and are assumed to be executed by a priority-based scheduler.

Referring to an execution flow of the message handling thread 940 shown in FIG. 6, the message handling thread 940 receives messages from the message polling thread 920 with priorities of the messages, processes the messages according to the priorities, if message processing is complete, returns to the thread pool 950, and awaits until a next message processing request is received.

According to an embodiment of the present invention, to solve a problem of a priority inversion when the message polling thread 920 is only used, when a kernel is called, the priority message processing unit 930 searches the message waiting queue 910 instead of for the message polling thread 920.

When the priority message processing unit 930 compares a thread having the highest priority among threads that are currently executable and a message having the highest priority among the received messages and determines that the priority of the message is higher than the thread, as shown in FIG. 7, the priority message processing unit 930 receives the message handling thread 940 from the thread pool 950 instead of the message polling thread 920 to allow the message to be processed by the corresponding thread.

According to an embodiment of the present invention, the priority message processing unit 930 may limit a delay frequency of a message that arrived in the message waiting queue 910 by a message having a lower priority than that of the message to one time at the maximum by using the above-described method, thereby predicting a delay time.

FIG. 10 is a flowchart of a message processing method between processors, according to an embodiment of the present invention.

As shown in FIG. 1, messages that are to be transmitted to a receiving processor are stored in a message waiting queue in a shared memory to process messages between the receiving processor and a transmission processor. In this case, priorities of the messages are set and stored when the messages are stored (operation S1010).

A message polling thread of the receiving processor searches or monitors the message waiting queue by using polling method and receives the messages stored in the message waiting queue based on the priorities (operation S1020).

A priority message processing unit (see FIG. 7) monitors the message waiting queue instead of the message polling thread when a kernel is called, determines whether a priority of a message having the highest priority stored in the message waiting queue is higher than a priority of a thread having the highest priority among executable threads on the receiving processor, and, if the priority of the message is higher than that of the thread, receives the corresponding message (operation S1030).

The messages are received from the message polling thread or the priority message processing unit based on the priorities, a message handling thread is assigned from a thread pool, and the received messages are transmitted to the message handling thread (operation S1040).

After the transmitted messages are processed by the message handling thread, the message handling thread returns to the thread pool (operation S1050).

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A message processing apparatus that processes a message between processors, the apparatus comprising:
   a message waiting queue implemented in a shared memory and temporarily storing messages, wherein each of the messages comprises priority information indicating a task processing order;
   a message polling thread for receiving the messages in order of high priorities by monitoring the message waiting queue by using a polling thread in an idle time of a receiving processor that uses the shared memory; and
   a priority message processing unit for monitoring the message waiting queue instead of the message polling thread when a kernel is called, and, if a message having a higher priority than that of a thread having the highest priority among executable threads is on the receiving processor, processing the having the higher priority, wherein at least one of the message waiting queue, the message polling thread, and the priority message processing unit is implemented by a hardware processor message.

2. The message processing apparatus of claim 1, further comprising: a message handling thread for, if a message processing request is received from the message polling thread or the priority message processing unit, receiving and processing messages from the message polling thread or the priority message processing unit based on priorities of messages, if message processing is complete, returning to a thread pool, and awaiting until a next message processing request is received.

3. The message processing apparatus of claim 2, wherein if the messages stored in the message waiting queue are non-blocking messages, the message polling thread processes the non-blocking messages.

4. The message processing apparatus of claim 2, wherein the message handling thread inherits priority of received message when receiving a message from the message polling thread or the priority message processing unit.

5. The message processing apparatus of claim 1, wherein the message polling thread is executed in the idle time of the receiving processor, wherein no executable thread is present in the idle time.

6. The message processing apparatus of claim 1, wherein the calling of the kernel includes cases in which a thread changes a state from waiting to ready, a thread changes a state from running to finishing, a thread changes a state from running to waiting, a new thread arrives, and an interrupt occurs.

7. The message processing apparatus of claim 1, wherein the message polling thread processes the messages by using polling processing.

8. The message processing apparatus of claim 1, wherein a receiving processor performs input and output processing, and a transmission processor performs image processing.

9. A message processing method performed on a receiving processor, the method comprising:
   receiving and processing messages stored in a message waiting queue of a shared memory according to priorities of the messages through a message polling thread;
   when a kernel is called, searching the message waiting queue by a priority message processing unit, instead of for the message polling thread;
   comparing a priority of a message having the highest priority stored in the message waiting queue and a priority of a thread having the highest priority among executable threads by the priority message processing unit; and
   if the priority of the message having the highest priority stored in the message waiting queue is higher than the priority of the thread having the highest priority, processing the message having the highest priority in the priority message processing unit.

10. The message processing method of claim 9, further comprising:
    receiving a message processing request from the message polling thread or the priority message processing unit in a message handling thread;
    receiving and processing messages from the message polling thread or the priority message processing unit according to priorities of the messages in the message handling thread; and
    if message handling is completed by the message handling thread, returning to a thread pool and awaiting until a next message processing request is received.

11. The message processing method of claim 9, wherein the message polling thread processes the messages by using polling method.

12. The message processing method of claim 9, wherein the message polling thread periodically monitors the shared memory by using a polling thread in an idle time of a receiving processor that uses the shared memory in communication between processors.

13. The message processing method of claim 9, wherein the messages comprise message type information, priority information of jobs that are to be processed, and location information of data stored in the shared memory.

14. A message processing apparatus that processes a message between processors, the apparatus comprising:
    a message waiting queue implemented in a shared memory accessible by a transmission processor and a receiving processor and temporarily storing messages that are to be transmitted to the transmission processor, wherein each of the messages comprises priority information indicating a task processing order;
    a message polling thread for receiving the messages in order of high priorities by monitoring the message waiting queue; and
    a priority message processing unit for monitoring the message waiting queue instead of the message polling thread when a kernel is called, and, if a message having a higher priority than that of a thread having the highest priority among executable threads is stored in the message waiting queue, processing the having the higher priority, wherein at least one of the message waiting queue, the message polling thread, and the priority message processing unit is implemented by a hardware processor message.

15. A message processing apparatus that processes a message between processors, the apparatus comprising:
a message waiting queue for temporarily storing messages having priorities that are transmitted between a transmission processor and a receiving processor that use a shared memory;
a message polling thread for receiving the messages according to the priorities by monitoring the message waiting queue by using polling method in an idle time of the receiving processor;
a priority message processing unit for monitoring the message waiting queue instead of the message polling thread when a kernel is called, and, if a priority of a message having the highest priority stored in the message waiting queue is higher than that of a thread having the highest priority among executable threads of the receiving processor, receiving the message having the highest priority; and
a message handling thread for processing the messages received from the message polling thread or the priority message processing unit based on the priorities, if message processing is complete, returning to a thread pool, and awaiting until a next message processing request is received, wherein at least one of the message waiting queue, the message polling thread, and the priority message processing unit is implemented by a hardware processor.

16. The message processing apparatus of claim 15, wherein if the messages stored in the message waiting queue are non-blocking messages, the message polling thread processes the non-blocking messages.

* * * * *